United States Patent [19]

Fischer

[11] 4,355,933
[45] Oct. 26, 1982

[54] MOUNTING ELEMENT FOR SECURING AN OBJECT TO A SUPPORT STRUCTURE

[76] Inventor: Artur Fischer, Weinhalde 34, 7244 Tumlingen, Waldachtal, Fed. Rep. of Germany

[21] Appl. No.: 145,058

[22] Filed: Apr. 30, 1980

[51] Int. Cl.³ .................... F16B 13/06; F04G 21/00
[52] U.S. Cl. ........................... 411/19; 52/744; 411/82
[58] Field of Search ........... 411/19, 15, 82; 52/744, 52/743, 700, 698; 403/408, 405; 405/260

[56] References Cited

U.S. PATENT DOCUMENTS

| | | | |
|---|---|---|---|
| 2,324,520 | 7/1943 | Lanson | 411/19 X |
| 3,108,404 | 10/1963 | Lamb | 52/743 X |
| 4,001,989 | 1/1977 | Fischer | 52/743 X |
| 4,028,857 | 6/1977 | Fischer | 52/744 X |
| 4,044,512 | 8/1977 | Fischer et al. | 52/744 X |
| 4,063,582 | 12/1977 | Fischer | 411/82 |
| 4,120,128 | 10/1978 | Pauls | 52/744 X |

FOREIGN PATENT DOCUMENTS 1338660 11/1973 United Kingdom ............. 411/82

Primary Examiner—Ramon S. Britts
Attorney, Agent, or Firm—Michael J. Striker

[57] ABSTRACT

A mounting element for supporting an object to a support structure consists of an anchoring part, an intermediate part and an extension part which is in engagement with the object to be fixed. The anchoring part is surrounded by a sheathing in which binding material is injected so as to fill out a hollow space in order to anchor the mounting element. The intermediate part is provided with an internal portion having a sealed bore hole in which a screw is penetrating after the binding material is hardened and the feed device is withdrawn. Through inserting a sleeve into the extension part which achieves a bracing of the object.

13 Claims, 2 Drawing Figures

MOUNTING ELEMENT FOR SECURING AN OBJECT TO A SUPPORT STRUCTURE

SUMMARY OF THE INVENTION

It is an object of the invention to create an improved mounting element for securing an object to a support structure having hollow spaces, and a method for supporting the object thereto.

In keeping with this object and with others which will become apparent hereafter, one feature of the present invention resides, briefly stated, in a mounting element for mounting an object to a support structure, comprising an anchoring part having an inserting end and a rear end, a sleeve-shaped intermediate part connected to the rear end and provided with an internal portion having a bore hole so as to define a gap within the intermediate part, the bore hole being engageable with a fastening screw, and a sleeve-shaped extension part integrally connected to the intermediate part and engaging the object.

According to a further feature of the invention, the bore hole of the internal portion is sealed by a membrane which is easily penetrable by the point of the fastening screw. Through the provision of such a membrane, the bore hole cannot be soiled by the binding material fed by the feeding device. Moreover, the membrane provides a resistance counter to the turning in of the fastening screw thereby permitting a control of the hardening of the binding material by adjusting the resistance through variation of the thickness of the membrane. In the event that the extension part is co-rotating when the screw is screwed in and trying to penetrate the membrane, this is an indication that no complete hardening of the binding material has already occurred.

In accordance with still another feature of the invention, the bore hole of the internal portion can be provided with longitudinally extending inner ribs in which the thread of the fastening screw can cut in. This development provides an additional control of the state of the binding material since the extension part will co-rotate when the fastening screw is screwed in too early due to the resistance exerted by the inner ribs.

According to yet another feature of the invention, the anchoring part is surrounded by an extendible sheathing of tissue-like material when the support structure has hollow spaces. The sheathing is fixed to the inserting end of the anchoring part by a cap and at the rear end thereof by a collar. Thus, the anchoring part can be anchored within the support structure by injecting binding material which surrounds the anchoring part and consequently is able to receive high forces. Moreover, through the provision of the sheathing, the amount of injected binding material can be limited.

In accordance with still another feature of the invention, the cap is provided with a point in order to facilitate the inserting and penetrating of the mounting element into the mounting hole within the support structure. This development is especially suitable when the support structure is superposed by insulating mats.

It is especially advantageous to provide the extension part with an outer diameter larger than the outer diameter of the intermediate part since a stop shoulder is obtained which permits the adjustment of the proper depth of anchoring and the receiving of compression forces by abutting the surface of the support structure. Moreover, it is advantageous to provide the extension part with further stop members at a distance to the support structure in order to achieve a spaced assembly of the object relative to the support structure, for example in the event of interposing an insulating mat between the object and the support structure. In the preferred embodiment, these stop members are elastic projections which are abutting the rear side of the object when inserting the mounting element through the object into the mounting hole so that the projection achieves an abutment for the object to be fixed.

A method of fastening an object to a supporting structure comprises the steps of drilling a first bore hole through the object, drilling a mounting hole through the support structure, inserting a mounting element of a construction so as to cooperate with the respective holes, providing a feeding device for injecting a binding material so as to anchor the mounting element, withdrawing the feeding device, and inserting a sleeve into the mounting element to provide an abutment for the object.

Consequently, all steps necessary for anchoring and assembling the object to the support structure can be performed from the front side of the object to be fixed. Thus, a simple assembly of objects to a support structure having hollow spaces is achieved which is further inexpensive and is carried out in a short time period.

In accordance with a further feature of the invention, the abutment of the sleeve can be developed as a countersunk head so as to achieve a flush assembly of the front side of the object and sleeve after the assembly. Since, on the one hand, the countersunk head is pressed against the object and, on the other hand, penetrates telescopically into the extension part, a complete and corrosion-proof sealing of the fastening screw is achieved. Only the exposed side of the screw head is to be protected against corrosion, for example by a coating.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
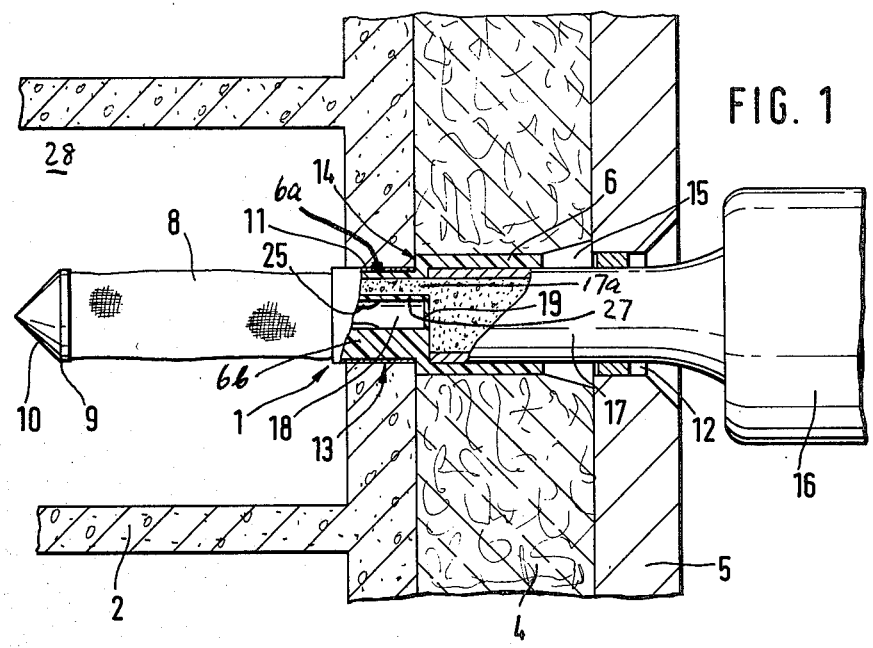
FIG. 1 shows a mounting element according to the invention inserted into a support structure and connected with a feed device.
Figure 2:
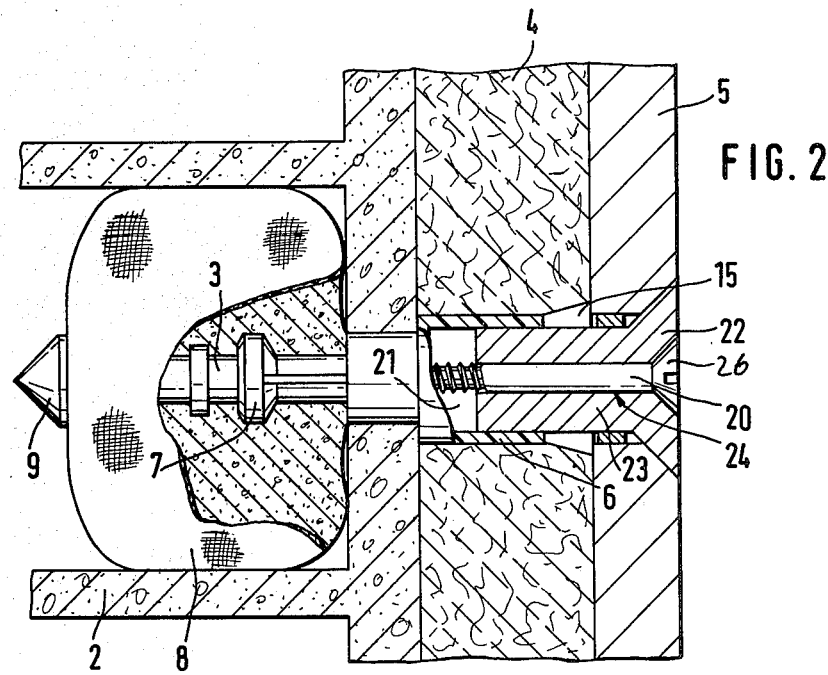
FIG. 2 shows the mounting element in FIG. 1 after the anchoring and supporting of the object.

Referring firstly to FIG. 1, in which a mounting element 1 is illustrated and connected with a feeding device 16 for injecting binding material. The mounting element 1 consists of an anchoring part 3 protruding into a hollow space 28 in a support structure 2 and having an inserting end 10 and a rear end to which an intermediate part 6a is connected and an extension part 6 which is supporting an object 5 to the support structure 2. The extension part 6 is integrally connected to the intermediate part 6a. As can be seen from FIG. 2, the anchoring part 3 is provided with locking elements 7, spaced along the longitudinal axis thereof and projecting therefrom. The inserting end 10 of the anchoring part 3 is provided with a cap 9 of conical shape so as to develop a point in order to facilitate the inserting of the mounting element 1 in a mounting hole 13 of the support structure. This development is especially then of advantage when using an insulating mat 4 interposed between the object 5 and the support structure 2. In addition, the cap 10 serves as an attachment for one end of a sheathing 8 which completely surrounds the anchoring part 3 in longitudinal direction thereof. The sheating 8 consists of an expandable fabric-like material so that upon injection of binding material, the sheathing 8 is extended according to the dimension of the hollow space 28 which is filled out consequently thereby anchoring the mounting element 1. The sheathing 8 extends along the anchoring part 3 and is attached by a collar 11 surrounding the intermediate part 6a.

The intermediate part 6a is provided with an internal portion 6b having a bore or flange 18 in which a fastening screw 20 is engageable. The bore 18 is sealed by a membrane 19 which is penetrable when inserting and screwing in the screw 20 so that no soiling of the bore hole 18 is achieved when injecting binding material. The internal portion 6b is of such a dimension within the intermediate part 6a that a gap 27 is obtained in between, the purpose of which is to be described further below.

As already mentioned, the intermediate part 6a is integrally connected with the extension part 6 which is supporting the object 5. The extension part 6 has a diameter larger than the diameter of the intermediate part 6a so that a stop shoulder 14 is developed serving as a limitation of the inserting movement of the mounting element 1. At a distance to the stop shoulder 14 in axial direction, the extension part 6 is further provided with elastic projections 15 acting as a barb since the projections abut the rear end of the object 5 and thus form a range spacing for the object 5.

For securing the object 5 to the support structure 2 having the hollow space 28, the bore hole 12 is drilled in the object 5 and into the insulating mat 4. This object 5 can be used as drill jig for drilling of mounting holes in the support structure 2 when using objects having a plurality of bore holes, like, for example a support strip. Thus, a mounting hole 13 is drilled into the support structure 2 wherein the diameter of the mounting hole 13 is smaller than the diameter of the bore hole 12. In order to achieve an accurate alignment of both holes 12, 13, it is suitable to use a paper sleeve in the mounting hole 12 for guidance of a drill. After the provision of the bore hole 12 and the mounting hole 13, the mounting element 1 which is advantageously of plastic material is inserted through the object 5 into the respective holes 12, 13 wherein the stop shoulder 14 limits the inserting movement and the projections 15 prevent a retracting of the mounting element when abutting the rear side of the object 5. In this position, a feeding device 16 is inserted into the mounting element 1. The feeding device 16 has a nozzle 17 of such construction that one portion thereof completely occupies the interior base 21 of the extension part 6 and another portion 17a, which is the feed portion, projects from the one portion in axial direction and fits exactly into the gap 27 so as to inject binding material into the sheathing 8 and thus fill out the hollow space 28 and anchor the mounting element 1 in the support structure 2. Since the feeding device 16 has an outer diameter corresponding to the interior diameter of the extension part 6, and the feed portion 17a corresponds to the dimension of the gap 27, the interior space 21 remains free of binding material so that no difficulties occur when inserting the fastening screw 20.

After hardening of the binding material has taken place and the feed device 16 is withdrawn, a sleeve 23 is inserted into the extension part 6. The sleeve 23 acts as an abutment for the support of the object 5 and is provided with a countersink head 22 as well as with an axial bore hole 24 which is in alignment with the bore hole 18 of the internal portion 6b wherein the bore 18 is also protected from any contact with binding material to the membrane 19 which is tightly sealing the same. The fastening screw 20 is inserted into the bore hole 24, thereby penetrating through the membrane 19 into the bore 18 which is provided with longitudinally extending inner ribs 25. Upon screwing in of the fastening screw 20 into the bore 18, a thread is cut into the inner ribs 25. Simultaneously, the head 26 of the screw 20 is moving the sleeve 23 in direction to the intermediate part 6a so as to achieve a bracing of the object 5 counter to the projections 15. Since the head 26 of the fastening screw 20 is developed as flat head, a flushing assembly is achieved after having supported the object 5 to the support structure 2, as can be seen from FIG. 2.

It will be understood that each of the elements described above, or two or more together, may also find a useful application in other types of mounting elements differing from the type described above.

While the invention has been illustrated and described as embodied in a mounting element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mounting arrangement for mounting an object at a distance from a support structure having an anchoring recess, the arrangement comprising a mounting element including an anchoring part having an inserting end provided with a locking portion insertable in said recess and a rear end, a sleeve-shaped intermediate part and a sleeve-shaped trailing part engageable with an object to be fastened, said intermediate part being provided with an internal portion having a bore and being formed with a gap forming a passage for a cementing material to be injected into said recess for locking said locking portion, said bore having a seal; a fastening screw adapted to puncture said seal and to be received in said bore thereby; and a sleeve engageable with said object and insertable in said trailing part, said sleeve receiving said fastening screw and having an abutment for supporting the object to be fastened.

2. A mounting arrangement as defined in claim 1, wherein the mounting element is of plastic material.

3. A mounting arrangement as defined in claim 2, wherein the seal of the bore is removable.

4. A mounting arrangement as defined in claim 1, wherein the seal of the bore is a membrane penetrable by the fastening screw.

5. A mounting arrangement as defined in claim 1, wherein the internal portion is provided with longitudinally extending inner ribs.

6. A mounting arrangement as defined in claim 1, wherein the anchoring part is provided with an extendable sheathing receiving the cementing material, said sheathing being fixed to the inserting end and to the rear end of the anchoring part.

7. A mounting arrangement as defined in claim 6, wherein the sheathing is of fabric-like material.

8. A mounting arrangement as defined in claim 6, wherein the sheathing is fixed to the inserting end by a cap and to the rear end by a collar.

9. A mounting arrangement as defined in claim 8, wherein the cap is of conical shape so as to form a pointed end.

10. A mounting arrangement as defined in claim 1, wherein the trailing part has a first diameter and the intermediate part has a second diameter smaller than the first diameter.

11. A mounting arrangement as defined in claim 1, wherein the trailing part is provided with a stop means for holding the object to be fastened at a distance from the support structure.

12. A mounting arrangement as defined in claim 11, wherein the stop means is in form of elastic projections arranged at the trailing part at its periphery.

13. A mounting arrangement as defined in claim 11, wherein said sleeve is provided with a countersink head forming said abutment.

* * * * *